United States Patent [19]
Musto et al.

[11] Patent Number: 5,888,072
[45] Date of Patent: Mar. 30, 1999

[54] FUEL SPILL MODULE FOR FIREFIGHTER TRAINER

[75] Inventors: Dominick J. Musto, Middlesex; Steven C. Luftig, Oakland, both of N.J.

[73] Assignee: Symtron Systems, Inc., Fair Lawn, N.J.

[21] Appl. No.: 964,090

[22] Filed: Nov. 4, 1997

[51] Int. Cl.⁶ ................................................. G09B 19/00
[52] U.S. Cl. .............................................................. 434/226
[58] Field of Search ................................... 434/219, 226, 434/365, 382

[56] References Cited

U.S. PATENT DOCUMENTS

| | | | |
|---|---|---|---|
| 4,861,270 | 8/1989 | Ernst et al. | 434/226 |
| 4,983,124 | 1/1991 | Ernst et al. | 434/226 |
| 5,052,933 | 10/1991 | Rogers et al. | 434/226 |
| 5,055,050 | 10/1991 | Rogers et al. | 434/226 |
| 5,233,869 | 8/1993 | Rogers et al. | 73/294 |
| 5,266,033 | 11/1993 | Rogers et al. | 434/226 |
| 5,320,536 | 6/1994 | Rogers et al. | 434/226 |
| 5,328,375 | 7/1994 | Rogers et al. | 434/226 |
| 5,335,559 | 8/1994 | Rogers et al. | 73/866 |
| 5,345,830 | 9/1994 | Rogers et al. | 73/866 |
| 5,411,397 | 5/1995 | Rogers et al. | 434/226 |
| 5,447,437 | 9/1995 | Joynt et al. | 434/226 |
| 5,518,403 | 5/1996 | Luftig et al. | 434/226 |

Primary Examiner—Klen T. Nguyen
Attorney, Agent, or Firm—Richard T. Laughlin, Esq.; Graham, Curtin & Sheridan

[57] ABSTRACT

A fire fighting trainer is provided for use in training firefighters comprising a series of lower profile burner tray assemblies which are fully self-contained for holding water which shields the tray structure from the high temperatures generated during the training exercise. A distribution system is provided to distribute and diffuse the propane above the water with a pilot igniting system for igniting the propane. The tray assemblies are covered by a metal netting which further shields them from the elevated temperatures and provides a walking surface over which personnel can advance during a training exercise. The low profile enhances the realism of the fuel spill fire and minimizes any hazards resulting from tripping on the surfaces.

10 Claims, 3 Drawing Sheets

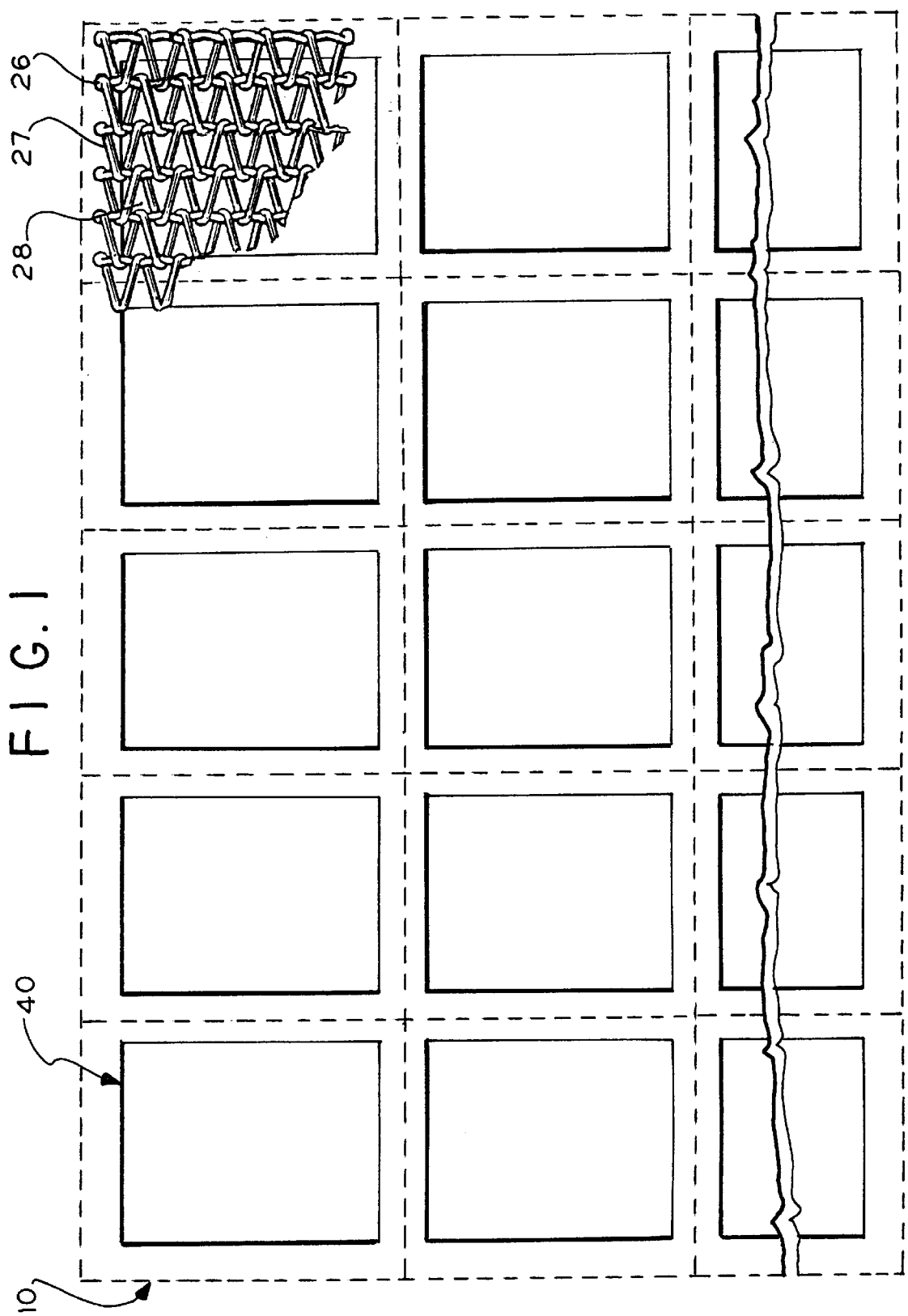

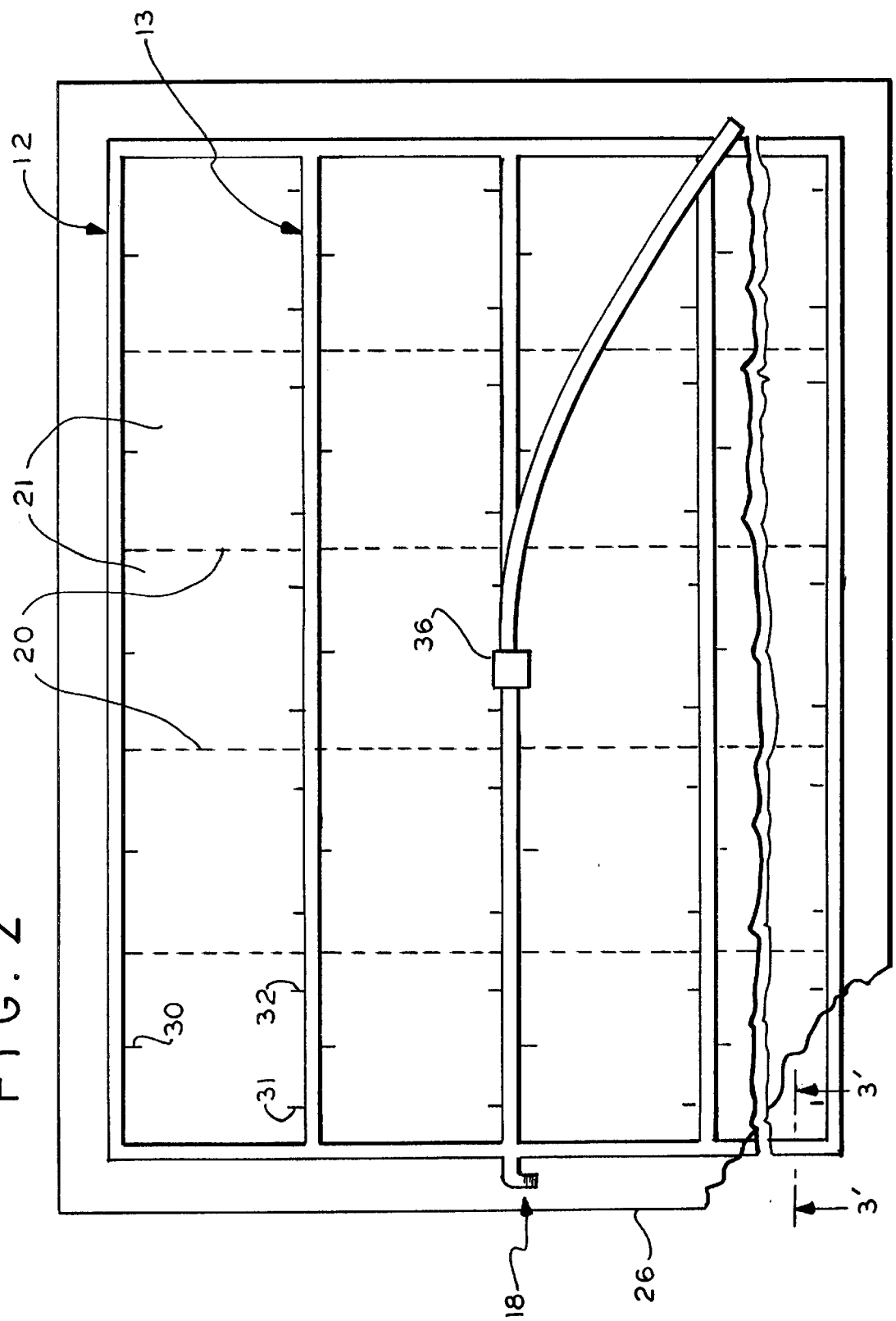

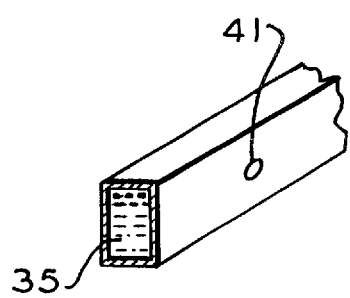
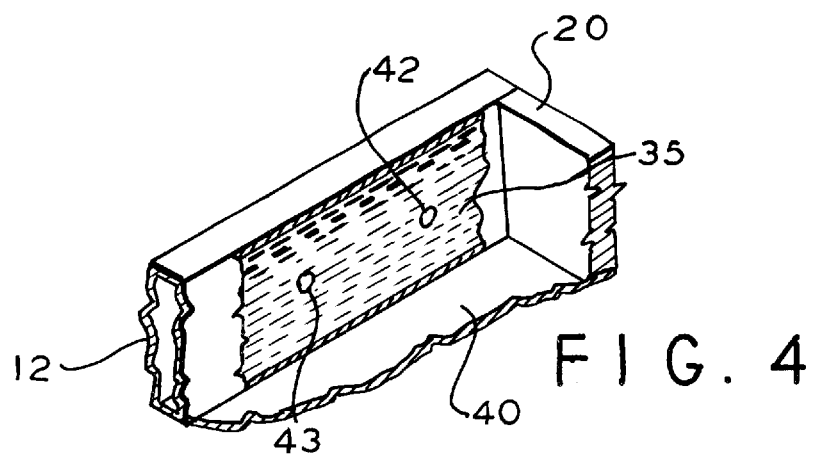

FUEL SPILL MODULE FOR FIREFIGHTER TRAINER

FIELD OF THE INVENTION

The invention relates generally to a portable firefighter training device and, in particular, the invention relates to a firefighter trainer having a fuel spill module.

BACKGROUND OF THE INVENTION

Firefighter trainers and associated apparatus are disclosed in a number of patents. U.S. Pat. No. 5,052,933 issued to Rogers, et al. on Oct. 1, 1991 and U.S. Pat. No. 5,411,397 issued on May 2, 1995 to Rogers et al. relate to training with aircraft fires and fuel spills. Related trainers are disclosed in Rogers, et al., U.S. Pat. No. 5,233,869 issued Aug. 10, 1993; U.S. Pat. No. 4,861,270 issued Aug. 29, 1989; U.S. Pat. No. 5,266,033 issued Nov. 39, 1993; U.S. Pat. No. 5,320,536 issued Jun. 14, 1994; U.S. Pat. No. 5,328,375 issued Jul. 12, 1994; U.S. Pat. No. 5,367,603 issued Nov. 22, 1994; U.S. Pat. No. 4,983,124 issued Jan. 8, 1991; U.S. Pat. No. 5,335,559 issued Aug. 9, 1994; U.S. Pat. No. 5,055,050 issued Oct. 8, 1991; and U.S. Pat. No. 5,345,830 issued Sep. 13, 1994; and U.S. Pat. No. 5,518,403 issued to Luftig, et al. on May 21, 1996. All of the disclosures in these patents are incorporated in this application by reference.

Other references contain fire fighting trainers. The magazine *Popular Science* in the November 1994 issue on page 27 describes a stationary computer-controlled facility at the Dallas-Ft. Worth airport for training firefighters on how to battle airport fires. The facility has mock-ups of an aircraft cabin, tail and wing engines, an automobile, an airport warehouse, a hotel room and a fuel spill. Smoke is provided by burning vegetable oil. The fire is supplied by propane fire-places which can be turned off at any time. The fuel-spill area surrounds a Boeing 737 mock-up and is divided into eight pie-piece-shaped segments so trainers can vary the size of the blaze. Liquid soap is added to the water fed to hoses to simulate foam. When the firefighters turn their hoses on the burning area, the water strikes metal discs embedded in the ground. Once the discs are cooled by the water, the fire is shut off in that area by a computer.

U.S. Pat. No. 5,374,191 issued on Dec. 20, 1994 to Herman et al. discloses a firefighter training device including a fuel spill.

Invention Registration H1134 issued to Meadows, et al. on Feb. 2, 1993 discloses an aircraft fire fighting trainer with a special type of flame simulation. The trainer has deflector shields located adjacent to nozzles to force the flames into a channel adjacent to the mockup causing a rolling flame to engulf all of the fuselage of the mockup.

U.S. Pat. No. 5,415,551 issued to Semenza on May 16, 1995 discloses a trailered mobile firefighter trainer simulating an aircraft. The trainer includes a central control means connected to a fuel distribution and burner system. Live spotter personnel are used to observe the exercise and control the flames in propane fireplaces.

U.S. Pat. No. 5,447,437 issued Sep. 5, 1995 to Joynt et al. discloses a container with a fuel burner and a pilot light associated therewith. The container has a perforated platform or grating over the top of the container as an outlet for the flames. Various items, such as a waste paper basket simulation, can be placed on the upper side of the platform.

Of particular interest to this invention is the disclosure in U.S. Pat. No. 5,509,807 issued Apr. 23, 1996 to Joice et al. That patent is directed to the type of fire trainer where propane liquid is passed through a layer of water which converts it to a gas which is ignited on the surface of the water. The inventors perceived two problems with the apparatus which were available at that time: One problem is that there is a danger of an accumulation of propane gas in and about the apparatus. The danger of this situation is compounded by the fact that the injected odor ingredient normally added to propane to facilitate its detection becomes absorbed by the water so that the presence of extraneous, non-combusted gas is not evident by the smell. The second problem conceived is that the unprotected pilot flame will be extinguished by the fire fighting agents being applied to the simulated fire ignition system. It is stated that, for the safety of the firefighter trainees, it is critical to ensure the continuing presence of an unquenched pilot flame of significant size capable of igniting the persisting gas traces during and after the main burn. The patent describes an apparatus which utilizes a water combustion conflagration system wherein propane fuel is fed from beneath water maintained in a tank and burns on the upper surface of the water. The pilot flame ignition apparatus is placed over the surface of the water. Further, the pilot is keep on at all times during the training session to avoid the possibility of having unburned gas on the surface of the water. The pilot light has a substantially inextinguishable flame during the training exercise which is protected from, and substantially impervious to, the ingress of extinguishment agents applied to the flame during the exercise.

The possibility of a fire in an aircraft on the ground or at a crash site has gained particular attention because of the potentially large loss of life in such situations. The larger airports have been able to build ground training facilities to continuously train firefighters in how best to handle such fires. At smaller airports, the training is normally accomplished by sending the firefighters to large installations for the training. This has unique disadvantages, the major one being the loss of personnel caused by the off-site training. Because of this, there has developed a need for a portable installation which can be setup on irregular ground to carry out the desired training.

In the prior art, the burner elements are normally permanently secured to a specially designed burn pit structure. The structure is usually part of a fire training facility designed specifically for the purposes of conducting fire training. The burn pit is designed for the installation of the burner elements using 4000 psi concrete. The elements are secured to the concrete using stainless steel spikes and then covered with gravel or gravel and water which serves to diffuse the propane, provides partial protection from the heat and also serves as a walking surface for the firefighters.

One problem with the prior art is that the burner elements require a costly permanent structure for their installation and operation. Further, such devices are difficult to construct. The prior art also has the problem of high initial acquisition costs due to the need for on-site construction and installation efforts.

A propane-fueled spill fire simulation uses a large number of spill burner elements to cover the area of the burn. The elements are arranged in a matrix of various designs and the combination provides flame generation over a large area to create the appearance of a single large ground-based fire. Each burner element is subjected to the thermal shock arising from their exposure to elevated temperatures followed by rapid cooling from extinguishing agent application.

OBJECTS OF THE INVENTION

One of the objects of the present invention is to provide a fire fighting training apparatus for simulating fuel spills that gives a close-to-real-life aircraft fire for training purposes which can be safely controlled and quickly and efficiently terminated.

Another object of the present invention is to provide a modified aircraft fire fighting trainer which is mobile, allowing it to be used for training at a multitude of facilities to extinguish large scale fuel spill fires.

A further object of the invention is to provide elements that are rearrangeable.

Other objects and the advantages of the invention will be apparent from the following description when read in conjunction with the drawings.

SUMMARY OF THE INVENTION

According to the present invention, a mobile fire trainer is provided for use in training personnel at multiple training locations in aircraft rescue and in fighting fires typical of aircraft incidents and crashes. The invention comprises a liquid fuel supply system, a portable burner tray assembly containing an insulating liquid, distribution means for discharging liquid fuel at discharge points on top of the insulating liquid within the burner tray, a diffusion means to disperse liquid propane at the discharge points, and a shielding means for covering the entire surface of the burner tray for additional heat protection and walking support for firefighter trainees.

The portable burner element tray and associated hardware for the diffusion and combustion of liquid propane simulates actual fuel spill fires such as those occurring from aviation fuel spills. The trainer provides for realistic training in extinguishment of external aircraft fires.

The trainer comprises a fuel spill fire module comprising a series of flat trays of low profile which can be connected together to form a fuel spill display of any desired size or configuration. The trays can be any size desired, but generally about 8' wide×10' long. The 8' width permits their transportation over the national highway system. With 15 trays bound together in a 3 row×5 column matrix, the configuration would provide a 30'×40' usable fuel spill area.

Each tray contains an insulating liquid such as water. The trays have along part of their perimeter a square conduit for the liquid fuel. In addition, similar inter-connected conduits extend at equally spaced distances across the tray forming grids of rectangular passageways for the fuel. Each rectangular conduit extending across the tray has discharge ports at approximately evenly spaced distances for releasing the liquid fuel at a uniform rate. The square conduits sectionalize each tray into 2'×2' pans which ensure the insulating liquid will cover the entire tray even on sloped surfaces. A thermocouple is provided in each tray to detect agent application.

A stainless steel blanket of a tight weave of flexible mesh lies on top of each tray. The tight but flexible weave shields the underlying tubing and tray from much of the radiant heat and serves as a walking surface over the tray for the firefighter trainees. The open area of the mesh acts as a restriction to diffuse the fuel, such as liquid propane, released in the space underneath the blanket and also effectively disperses and directs a solid stream of insulating liquid, such as water, from the blanket to the tray below.

The novel features which are believed to be characteristics of the invention, both as to its organization and method of operation, together with further objects and advantages thereof, will be better understood from the following descriptions in connection with the accompanying drawings in which the presently preferred embodiments of the invention are illustrated by way of examples. It is expressly understood, however, that the drawings are for purposes of illustration and description only and are not intended as a definition of the limits of the invention.

BRIEF DESCRIPTION OF THE DRAWINGS

FIG. 1 is a perspective view of an aircraft fire fighting trainer according to the present invention showing the low profile tray;

FIG. 2 is a perspective view of the rectangular burner tray;

FIG. 3 is a section view of the fuel spill module taken along 3'—3' of FIG. 2; and FIG. 4 is an enlargement, partly in section, showing some of the nozzles for distributing the fuel.

DESCRIPTION OF THE PREFERRED EMBODIMENT

As shown in FIG. 1, a mobile aircraft rescue firefighter trainer or simulator or assembly generally indicated at 10 is provided. The trainer has a rectangular shape comprising a series of watertight, rectangular burner trays 40 each having a stainless steel blanket 26. Although the trays are shown in a rectangular configuration, they can be formed into any desired shape, such as an "I," "L" or the like. As shown in FIG. 2, each tray has rectangular conduits 12 extending around the perimeter. The rectangular conduits 12 are connected to additional cross-rectangular conduits 13 which extend across the tray at approximately even separations. As illustrated in FIG. 2, the cross-rectangular conduits 13 are three in number, but any number can be utilized. The conduit tubing serves two purposes: First, it is a conduit for the distribution and release of liquid propane and, second, it provides main structural support for the trays.

A thermocouple is provided in each tray to detect extinguishing agent application. The cross-conduits 13 are connected to metal side plates 20 to form a series of completed, water-tight, individual pans 21 bound by at least two conduits. In FIG. 2, 20 pans are shown in the 8'×10' rectangular burner tray.

The rectangular or square conduits are preferably formed from stainless steel 1.25 inches on each side. As shown in FIGS. 3 and 4, the rectangular conduits 12 allow for the flow of fuel 35 from a fuel inlet 18 as shown in FIG. 2, to a series of fuel discharge ports or nozzles 30, 31, 32 formed in the sides of the rectangular conduits facing the inside of each tray 40. Preferably, there are three fuel discharge ports 30, 31, 32 in each tray as shown in FIG. 2. These fuel discharge ports 30, 31, 32 can be formed by merely drilling holes 41, 42 and 43 in the square conduit or by inserting more elaborate discharge nozzles. The fuel inlet 18 is preferably located in middle of the trainer so that there is a balance of fuel discharging into the adjacent conduits. An insulating liquid, preferably water is placed in each pan within the tray.

A stainless steel mesh blanket 26 is placed over the tray and extends over the outer edges of the tray. This blanket serves four functions: It shields the tubing and tray from the radiant heat of the fire; it helps diffuse the liquid propane in the tray; it breaks up the extinguishing agent application so that water remains in the tray; and it serves as a smooth walking surface over the tray assembly.

The stainless steel blanket 26 is preferably a woven flexible mesh that lays on top of the tubing and trays. In the preferred embodiment, the mesh is fabricated with 16 gauge rods and 18 gauge spiral loops 27. The tight but flexible weave shields the underlying tubing and trays from much of the radiant heat and serves as a walking surface over the trays. The approximately 46% open area 28 of the mesh acts as a restriction to diffuse the liquid propane released in the space underneath and also effectively disperses and directs a solid stream of water directed at the blanket to the trays below.

The trays 40 being sectionalized ensure water retention on sloped surfaces. The sectionalization ensures that water will cover all of the bottom surface of the trays on grades up to 4%. The trays are welded to the tubing for a unitized and strengthened design.

A thermocouple 36 is provided in each tray to detect the application of an extinguishing agent and report this application to the control system which shuts off the fuel supply to the tray.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A fire fighting trainer for training firefighter trainees to extinguish fires comprising a liquid fuel supply system, a portable burner tray assembly containing an insulating liquid, distribution means for discharging liquid fuel at discharging points on top of the insulating liquid within the burner tray, a diffusion means to disperse liquid fuel at the discharge points, and a shielding means for covering the entire surface of the burner tray for additional heat protection and walking support for firefighter trainees.

2. The fire fighting trainer as described in claim 1, wherein the shielding means extends over the outer perimeter of trainer to allow for a smooth stepping area for the firefighter trainees.

3. The fire fighting trainer as described in claim 1, wherein the fire fighting trainer is a combination of two or more burner trays to create a simulation of a large area fuel spill fire.

4. The fire fighting trainer as described in claim 1, wherein the distribution means includes square tubing in a transverse arrangement having a plurality of openings for the release of the liquid fuel.

5. The fire fighting trainer as described in claim 1, wherein the distribution means is a series of transverse pipes enclosed and sectionalized to create water-tight trays for cooling.

6. The fire fighting trainer as described in claim 1, wherein the shielding means a stainless steel wire mesh blanket covering the tray.

7. The fire fighting trainer as described in claim 6, wherein the wire mesh extends particularly around the sides of the tray.

8. The fire fighting trainer as described in claim 1, wherein the height of the tray is less than 1.5 inches.

9. The fire fighting trainer as described in claim 1, wherein the insulating liquid is water.

10. The fire fighting trainer as described in claim 1, wherein the liquid fuel is propane.

* * * * *